United States Patent [19]
Chen

[11] Patent Number: 5,014,128
[45] Date of Patent: May 7, 1991

[54] VIDEO INTERFACE CIRCUIT FOR DISPLAYING CAPTURING AND MIXING A LIVE VIDEO IMAGE WITH COMPUTER GRAPHICS ON A VIDEO MONITOR

[75] Inventor: Ben W. Chen, Fremont, Calif.

[73] Assignee: Atronics International Inc., Milpitas, Calif.

[21] Appl. No.: 342,740

[22] Filed: Apr. 24, 1989

[51] Int. Cl.$^5$ .............................................. H04N 5/14
[52] U.S. Cl. .................................. 358/160; 358/148; 358/183
[58] Field of Search ........................ 358/148, 160, 183

[56] References Cited

U.S. PATENT DOCUMENTS

| | | | |
|---|---|---|---|
| 4,651,209 | 3/1987 | Okada et al. | 358/148 |
| 4,677,470 | 6/1987 | Cooper et al. | 358/160 |
| 4,689,676 | 8/1987 | Nakajima et al. | 358/148 |
| 4,748,504 | 5/1988 | Ikeda et al. | 358/183 |

Primary Examiner—John W. Shepperd
Assistant Examiner—Michael D. Parker
Attorney, Agent, or Firm—Fliesler, Dubb, Meyer & Lovejoy

[57] ABSTRACT

A video interface circuit for displaying the output of a video camera on a video monitor of the type used for displaying computer output data. In a first mode of operation, data from a video camera is stored in a first video memory while data previously stored in a second video memory is displayed on a video monitor. In a second mode of operation, there is provided the further steps of displaying information previously stored in the first and second video memories alternately on the video monitor. In a third mode of operation, data previously stored in the first and second video memories is read out one word at a time. If a predetermined bit in the word read from the second video memory has a first predetermined logical level, the word read from the first video memory is displayed on the video monitor. Alternately, if the predetermined bit in the word read from the second video memory has a second predetermined level, the word read from the second video memory is displayed on the video monitor.

12 Claims, 5 Drawing Sheets

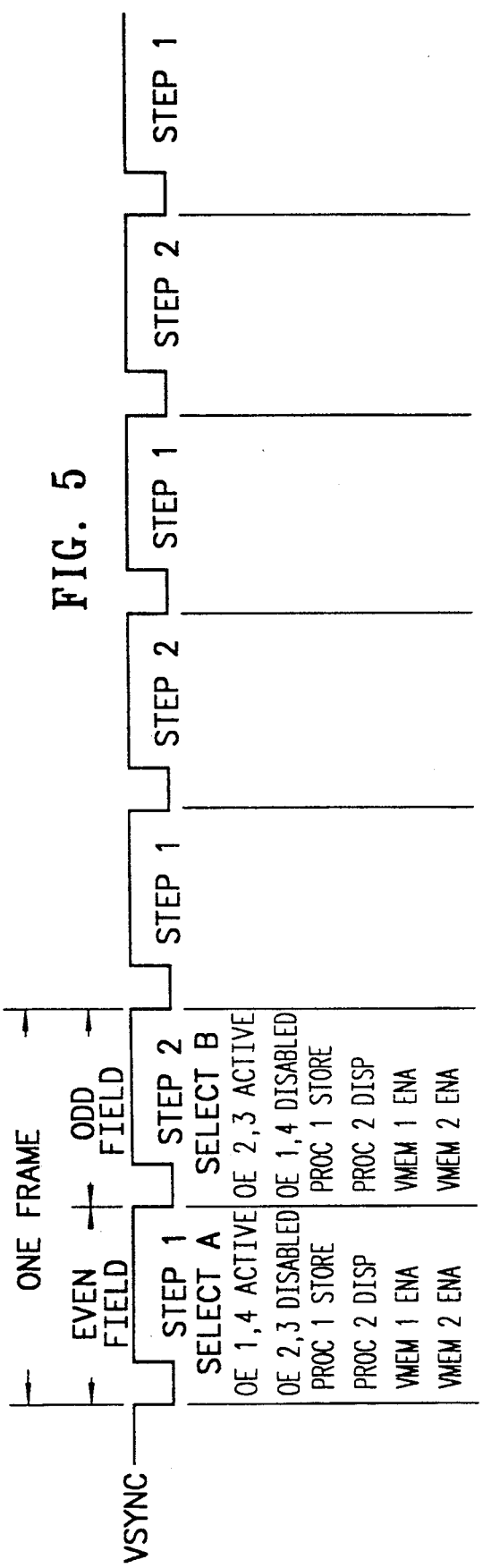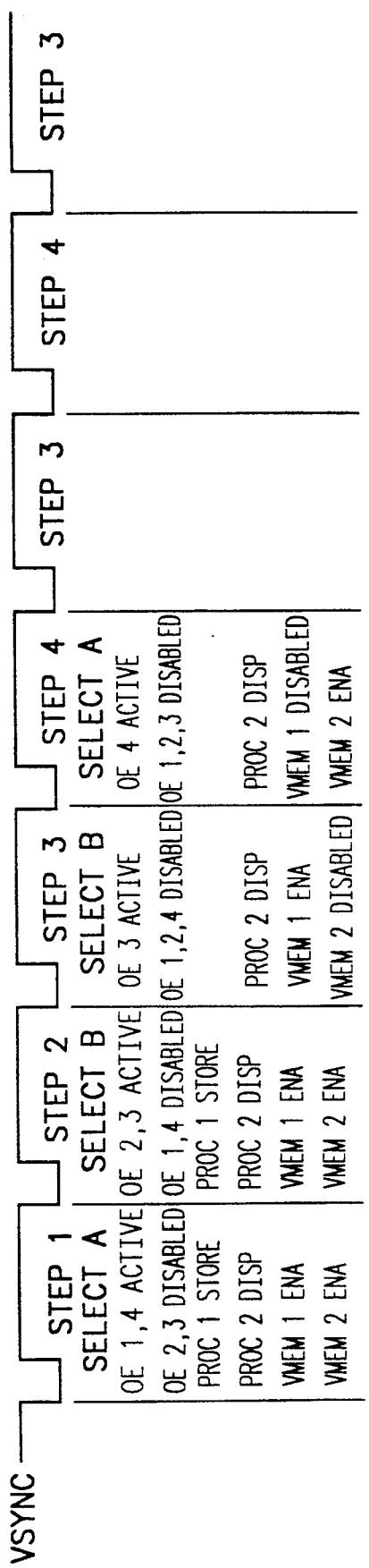

VIDEO INTERFACE CIRCUIT FOR DISPLAYING CAPTURING AND MIXING A LIVE VIDEO IMAGE WITH COMPUTER GRAPHICS ON A VIDEO MONITOR

BACKGROUND OF THE INVENTION

1. Field of the Invention

The present invention relates to video cameras and monitors in general and in particular to a novel interface circuit for displaying a video image from a video camera on a video monitor.

2. Description of the Prior Art

A television receiver or other video display device of the type that is normally used for displaying the output of a video camera is driven by horizontal and vertical sync signals having a predetermined frequency for controlling horizontal and vertical scan rates, respectively. In the United States, the predetermined frequencies of the horizontal and vertical sync signals are fixed according to an industry standard called an NSTC standard. In Europe, the corresponding frequencies are fixed according to another industry standard called a PAL standard.

A video monitor of the type that is commonly used as a peripheral device for displaying output data from a computer or the like is also driven by horizontal and vertical sync signals having a predetermined frequency. As in television receivers, the frequency of the horizontal and vertical sync signals control the horizontal and vertical scan rates. However, unlike the makers of television receivers, the manufacturers of video monitors are not required by any industry standard to use any particular frequency for the horizontal or vertical sync signals. As a consequence, most monitors made by different manufacturers and, indeed, different monitors made by a single manufacturer are found to use different frequencies for their horizontal sync signals.

While different frequencies are used for horizontal sync signals in video monitors, it is found that many manufacturers of video monitors use the same frequency for their vertical sync signals. That frequency, which typically corresponds to the frequency used by utility companies for generating electrical power, also happens to correspond to the frequency standard for NSTC and PAL vertical sync signals. In the United States that frequency is typically 60 Hz. In Europe that frequency is typically 50 Hz. It is also found that as long as the frequency of the vertical sync signals of a video monitor is identical to the frequency of the vertical sync signals of a video camera, the output of the video camera can be displayed on the monitor.

SUMMARY OF THE INVENTION

In view of the foregoing, principal objects of the present invention are a method and apparatus comprising a video interface circuit for displaying the output of a video camera or the like on a video monitor of the type used for displaying computer output data.

In accordance with the above objects, the interface circuit of the present invention comprises a pair of processors (PROC 1 and PROC 2), a pair of multiplexers (MUX 1 and MUX 2), a pair of video memories (VMEM 1 and VMEM 2), a plurality of buffers (BUFF 1, BUFF 2, BUFF 3, BUFF 4), an analog-to-digital converter, a digital-to-analog converter, a control signal generator and circuit means for coupling the interface circuit to a host central processing unit (CPU), a video camera and a video monitor.

As is well known, a video frame comprises two fields, referred to as an even field and an odd field. The even and odd fields are interlaced to form the frame. A vertical sync pulse is generated to commence each of the fields. A horizontal sync pulse is generated to commence each scan line in a field.

In practice, the interface circuit of the present invention has three modes of operation, i.e. a "live" mode, a "capture and then display" mode and a "mix" mode.

In the live mode, in response to data and control signals from the CPU in a repetitive two-step process, successive fields of video images from the video camera are alternately stored in and subsequently displayed on the video monitor from the video memories VMEM 1 and VMEM 2 under the control of the two processors PROC 1 and PROC 2 and the control signal generator.

In the capture and then display mode there are four steps. The first two steps are identical to the two steps in the live mode. Thereafter, in a repetition of the third and fourth steps, the contents of VMEM 1 and VMEM 2 are alternately displayed under the control of PROC 2 until the mode is terminated by a signal from the CPU.

In the mix mode there are two steps in which the contents of VMEM 1 and VMEM 2 are selectively read and displayed. As corresponding words from VMEM 1 and VMEM 2 are read, a video image of the word from either VMEM 1 or VMEM 2 is displayed depending on the logical level of a predetermined bit of each corresponding word read from VMEM 2. For example, if bit 15 of the word read from VMEM 2 is a "1", a video image of the word read from VMEM 1 is displayed. Alternatively, if bit 15 of the word read from VMEM 2 is a "0", a video image of the word read from VMEM 2 is displayed. After a field of data from VMEM 1 and VMEM 2 is displayed, steps 1 and 2 are repeated until the mode is terminated by a signal from the CPU.

BRIEF DESCRIPTION OF THE DRAWINGS

The above and other objects, features and advantages of the present invention will become apparent from the following detailed description of the accompanying drawings, in which:

FIG. 5 is a diagram of the steps involved in the execution of the live mode of the present invention;

FIG. 6 is a diagram of the steps involved in the capture and display mode of the present invention.

DESCRIPTION OF THE PREFERRED EMBODIMENT

Figure 1:
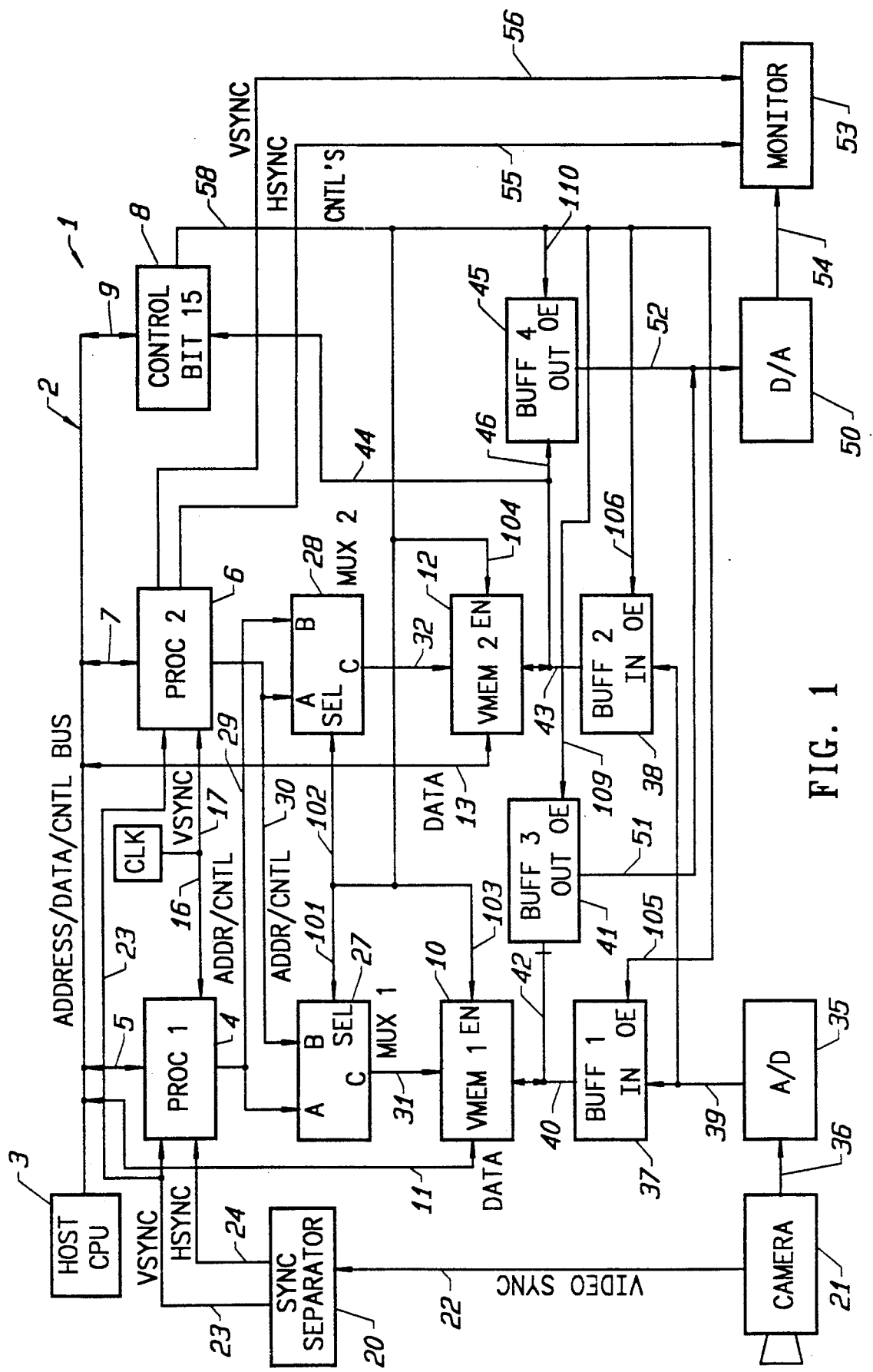
FIG. 1 is a block diagram of a video camera/monitor interface circuit according to the present invention.

Referring to FIG. 1, there is provided in accordance with the present invention an interface circuit designated generally as 1. In the circuit 1 there is provided an address/data/control bus 2. The bus 2 is provided for coupling the interface circuit 1 to a host central processing unit (CPU) 3 for providing address, data and control signals to the interface circuit 1 in a conventional manner. The bus 2 is also coupled to a first processor 4 (PROC 1) by means of a bus 5 to a second processor 6 (PROC 2) by means of a bus 7, to a control circuit 8 by means of a bus 9, to a first video memory (VMEM 1) 10 by means of a bus 11 and to a second video memory (VMEM 2) 12 by means of a bus 13. Buses 11 and 13 are provided to enable the CPU to communicate directly with VMEM 1 and VMEM 2 in a conventional manner. A pixel clock generator 15 is coupled to the first processor 4 by means of a line 16 and to the second processor 6 by means of a line 17.

A sync separator circuit 20 is provided for separating video sync signals received from a video camera 21 on an input line 22. The sync separator circuit 20 is provided for separating the video sync signals from the camera 21 into vertical sync signals (VSYNC) and horizontal signals (HSYNC). Alternately, the circuit 20 may be located within the camera 21.

As will be described in more detail below, the vertical sync signals are provided to the first processor 4 and the second processor 6 by means of a vertical sync signal line 23 for resetting a vertical counter in each of the processors 4 and 6. The horizontal sync signals are provided to the first processor 4 by means of a signal line 24 for resetting a horizontal counter in the first processor 4.

Coupled to the output of the processor 4 and the processor 6, there is provided a first multiplexer 27 (MUX 1) and a second multiplexer 28 (MUX 2) for routing address and control signals from the processors to the video memories. Each of the multiplexers 27 and 28 have a pair of inputs A and B and an output C. The processor 4 is coupled to the A input of the multiplexer 27 and to the B input of the multiplexer 28 by means of an address/control bus 29. The processor 6 is coupled to the B input of the multiplexer 27 and the A input of the multiplexer 28 by means of an address/control bus 30. The output C of the first multiplexer 27 is coupled to the first video memory 10 by means of a bus 31. The output C of the second multiplexer 28 is coupled to the second video memory 12 by means of a bus 32.

Video data from the camera 21 is provided to an analog-to-digital (A/D) converter 35 by means of a video signal line 36. The output of the A/D converter 35 is coupled to a first buffer 37 (BUFF 1) and to a second buffer 38 (BUFF 2) by means of a data bus 39.

The output of the first buffer 37 is coupled to the video memory 10 by means of a data bus 40. The output of the video memory 10 is coupled to a third buffer 41 (BUFF 3) by means of a data bus 42. The output of the second video memory 12 is coupled to the second video memory 12 by means of a data bus 43. Bit 15 of the second buffer 38 is also provided to the control circuit 8 by means of a signal line 44. The output of the second video memory 12 is coupled to a fourth buffer 45 (BUFF 4) by means of a data bus 46.

The outputs of the third and fourth buffers 41 and 45 are coupled to a digital-to-analog (D/A) converter 50 by means of a pair of data buses 51 and 52, respectively. Video data from the D/A converter 50 is provided for display on a monitor 53 by means of a video signal bus 54. Horizontal and vertical sync signals from the processor 6 are provided for the monitor 53 on a pair of signal lines 55 and 56, respectively. As will be further described below with respect to FIG. 4, control signals from the control circuit 8 for controlling the multiplexers 27, 28, the video memories 10, 12, and the buffers 37, 38, 41 and 45 are provided on a control signal bus 58 comprising a plurality of control signal lines 101-108.

Figure 2:
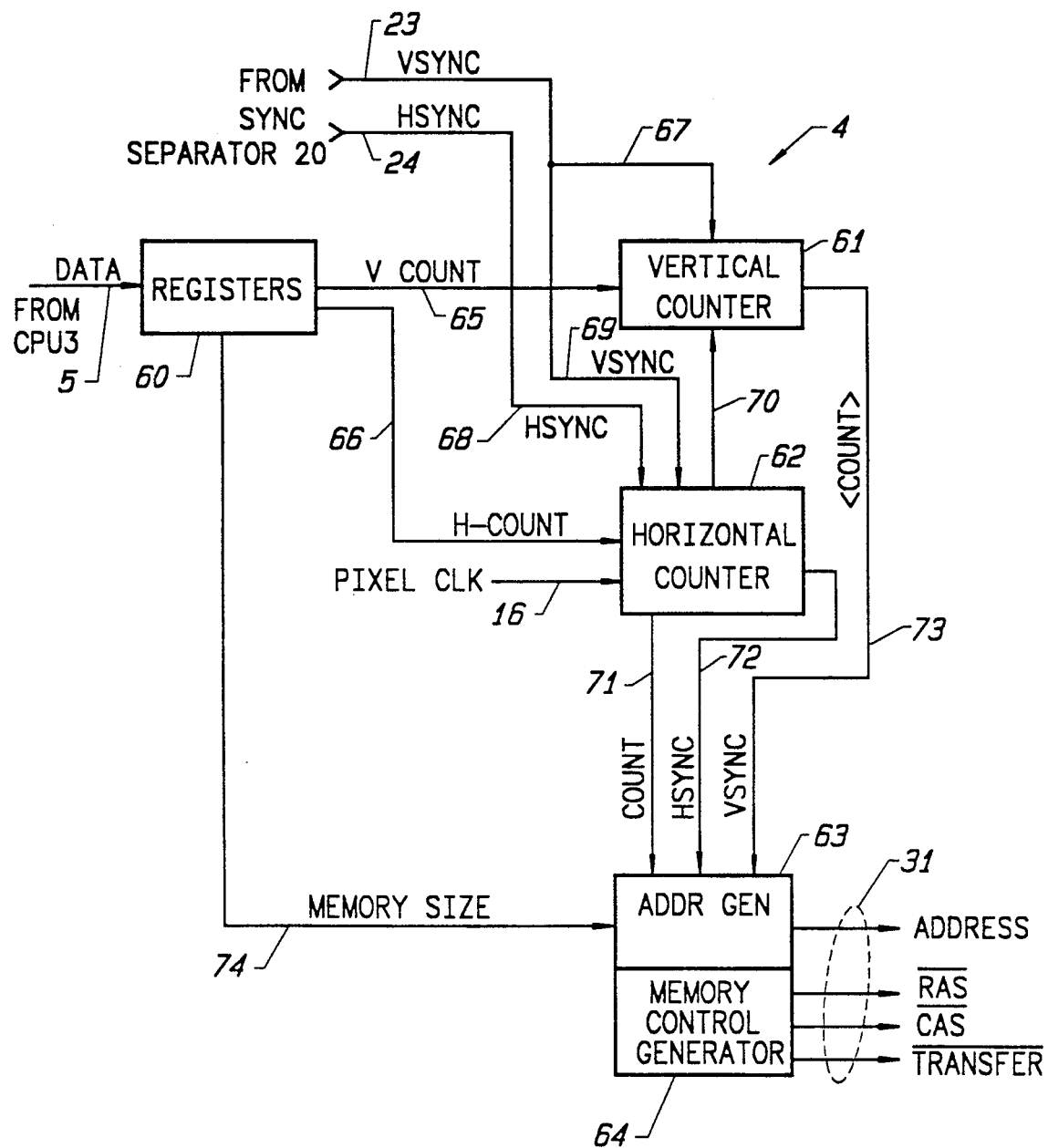
FIG. 2 is a block diagram of a PROC 1 according to the present invention.

Referring to FIG. 2, there is provided in the processor 4 (PROC 1) a data register 60 for receiving data from the CPU 3, a vertical counter 61, a horizontal counter 62, an address generator 63 and a memory control generator 64. A vertical count (VCOUNT) from the register 60 is provided to the vertical counter 61 by means of a signal line 65 for presetting the counter 61. The vertical count corresponds to the number of scan lines in a field of a frame. A horizontal count (HCOUNT) from the register 60 is provided to the horizontal counter 62 by means of a signal line 66 for presetting the counter 62. The horizontal count corresponds to the number of pixels in each scan line.

Vertical sync signals from the signal line 23 are provided to the vertical counter 61 by means of a signal line 67 for resetting the vertical counter 61 at the end of each frame. Vertical and horizontal sync signals from the signal lines 23 and 24 are provided to the horizontal counter 62 by means of signal lines 68 and 69 for resetting the horizontal counter 62 at the end of each frame and scan line, respectively. Signals for advancing the vertical counter 61 at the end of each scan line are provided by the horizontal counter 62 on a signal line 70. Count and horizontal sync signals from the horizontal counter 62 and vertical sync signals and count signals from the vertical counter 61 are provided to the address generator 63 and memory control generator 64 by means of signal lines 71-73 for generating the addresses and control signals $\overline{RAS}$, $\overline{CAS}$ and $\overline{TRANS FER}$ required by video memory 10. Signals corresponding to the size of the video memory 10 are provided by the register 60 to the address generator 63 and memory control generator 64 by means of a signal line 74 for use in generating the addresses for memory 10. Pixel clock signals are provided to the counter 62 for advancing the counter 62.

Figure 3:
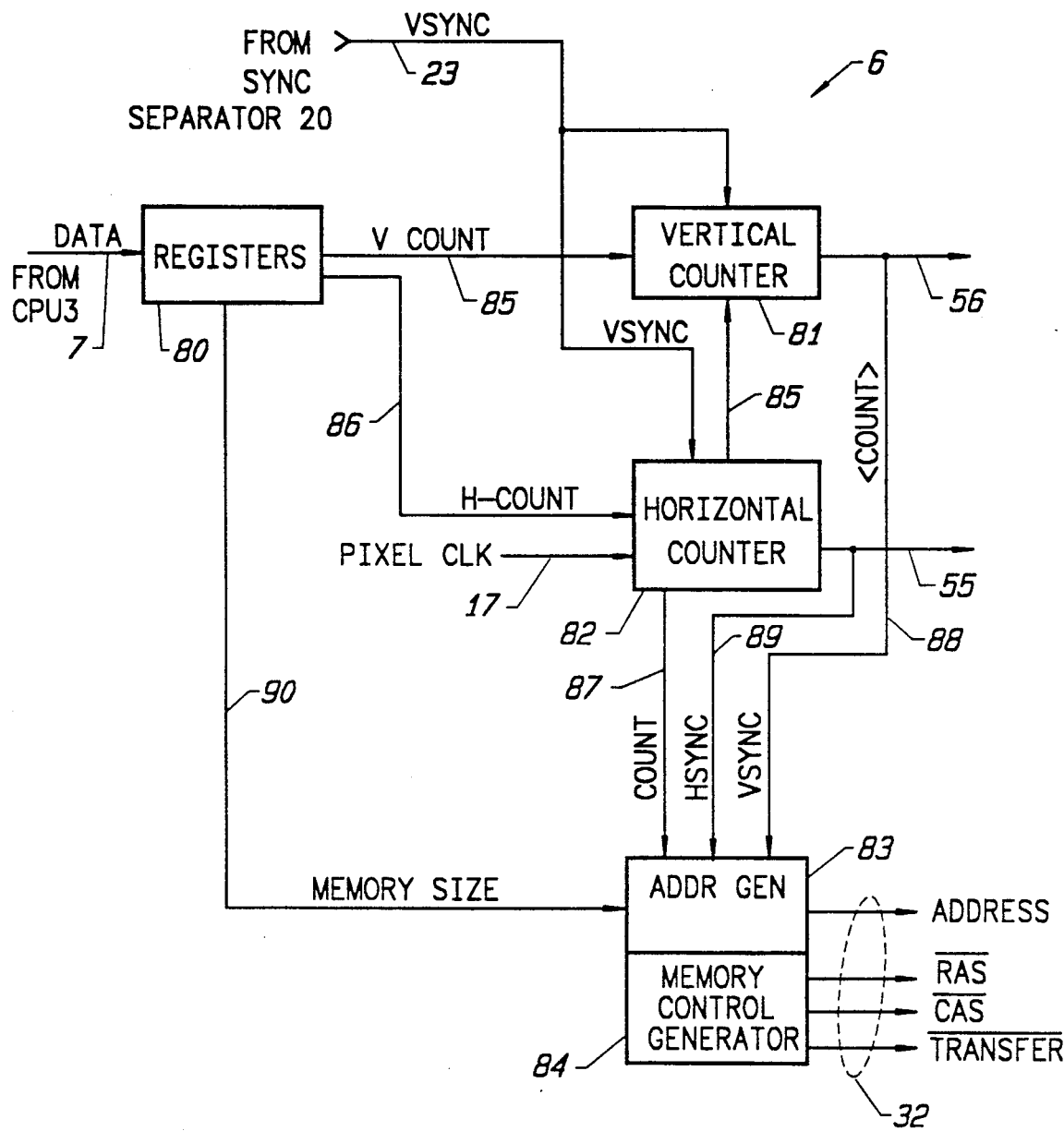
FIG. 3 is a block diagram of a PROC 2 according to the present invention.

Referring to FIG. 3, there is provided in the processor 6 (PROC 2) a register 80 for receiving data from the CPU 3, a vertical counter 81, a horizontal counter 82, an address generator 83 and a memory control generator 84. Vertical sync signals from the sync separator 20 are provided to the vertical counter 81 and the horizontal counter 83 by means of the signal bus 23 for resetting the counters 81 and 82 at the end of each frame. Signals for advancing the counter 81 at the end of each scan line are provided by the horizontal counter 82 on a signal line 85. Vertical count signals, as described above, from the registers 80 are provided to the vertical counter 81 by means of a signal line 85 for presetting the counter 81. Horizontal count signals, as described above, are provided from the registers 80 to the horizontal counter 82 by means of a signal line 86 for presetting the counter 82. Pixel clock signals are provided to horizontal counter 82 on the signal line 17 for advancing the counter 82. Count and horizontal sync signals from the horizontal counter 82 and vertical sync signals and count signals from the vertical counter 81 are provided to the address generator 83 and memory control generator 84 by means of signal lines 87-89 for generating the addresses and control signals $\overline{RAS}$, $\overline{CAS}$ and $\overline{TRANS FER}$ required by video memory 12. Signals corresponding to the size of the video memory 12 are provided by the registers 80 to the address generator 83 by means of a signal line 90 for use in generating the addresses for memory 12.

Figure 4:
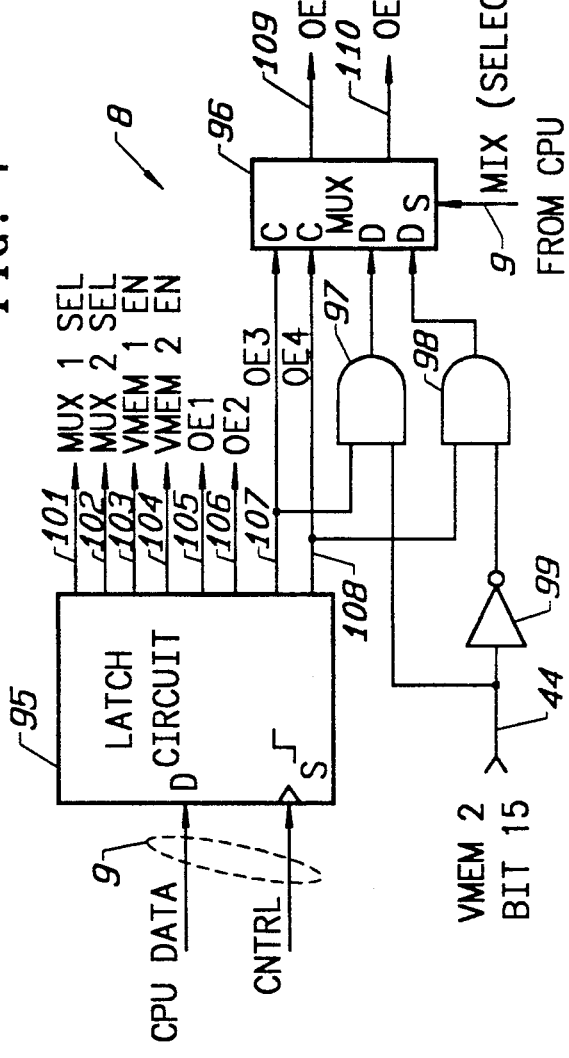
FIG. 4 is a block diagram of a control circuit according to the present invention.

Referring to FIG. 4, there is provided in the control circuit 8 a latch circuit 95 having data and control inputs D and S, a multiplexer 96 having a first set of inputs C, a second set of inputs D and a control input S, a pair of AND gates 97 and 98 and an inverter 99. The data and control signal inputs of the latch circuit 95 are coupled to the data and control bus 2 by means of the signal line 9 for receiving data and control signals from the CPU 3.

The latch circuit 95 provides a plurality of control signals on lines 101–108 for controlling the operation of the circuit 1 in each of its modes of operation as will be further described below. Control signals on the lines 101 and 102 select between the A and B inputs of the multiplexers 27 and 28, respectively. The control signals on the lines 103 and 104 enable the video memories 10 and 12, respectively. The control signals on lines 105 and 106 are provided for enabling the outputs of the first and second buffers 37 and 38, respectively. The output lines 107 and 108 are coupled to the C inputs of the multiplexer 96 and the AND gates 97 and 98 for providing on a pair of output lines 109 and 110 control signals for selectively enabling the third and fourth buffers 41 and 45, respectively.

As will be further described below, the multiplexer 96 is responsive to a control signal on the control line 9 for passing through to the lines 109 and 110 from its C inputs the output enable control signals on the lines 107 and 108 during the live, capture and display modes of the present invention. In the mixed mode, the output enable signals on the lines 107 and 108 are passed through multiplexer 96 via the AND gates 97 and 98 and its D inputs depending on the status of bit 15 in each word read from the video memory 12. For example, if bit 15 is a logical 1, the output of buffer 3 is enabled for displaying a video image of a word from video memory 10 on the monitor 53. Alternately, if bit 15 is a 0, the output of buffer 4 is enabled for displaying a video image of a corresponding word from the video memory 12 on the monitor 53.

In operation, data and control signals are provided by the CPU 3 on the address/data/control bus 2 to each of the processor 4 and 6. The data provided by the CPU corresponds to the number of scan lines in a field (VCOUNT) and the number of pixels in a scan lines (HCOUNT) and data corresponding to the size of each of the memories 10 and 12. The VCOUNT, HCOUNT and memory size are used by the vertical counters, horizontal counters, address generators and memory control generators in the processors 4 and 6 for generating the addresses and control signals for operating the video memories 10 and 12. The vertical and horizontal sync signals provided by the separator 20 are used for resetting the vertical and horizontal counters as shown in FIGS. 2 and 3. In addition, processor 6 provides vertical and horizontal sync signals on lines 55 and 56 for controlling the monitor 53.

As described below, the interface circuit of the present invention has three modes of operation, i.e. a "live" mode, a "capture and then display" mode and a "mix" mode.

Figure 7:
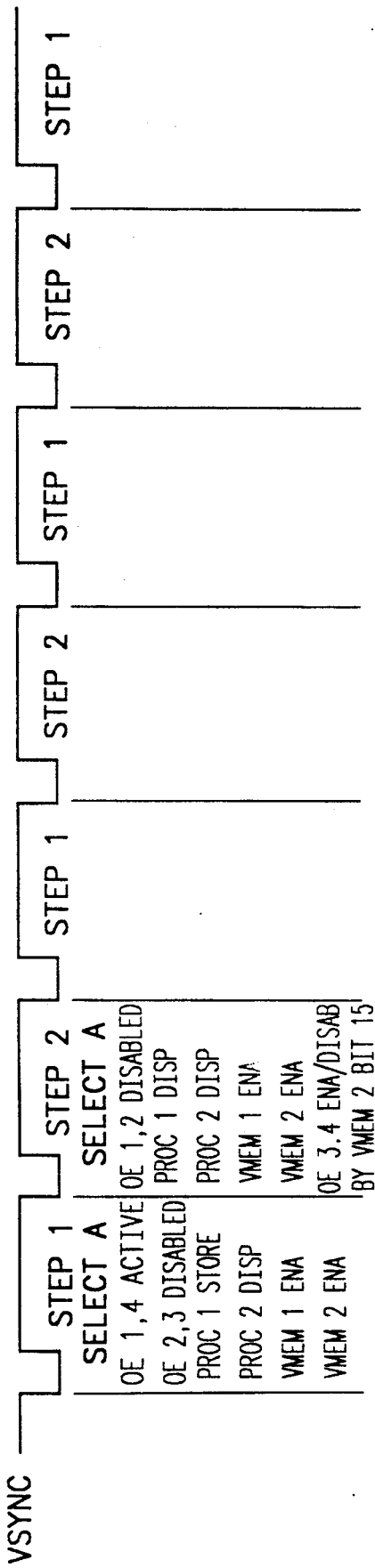
FIG. 7 is a diagram of the steps involved in the mixed mode of the present invention.

Referring to FIGS. 5–7, there is shown a diagram of the steps in each of the modes. Each step is synchronized with the vertical sync signals. Select A and Select B identifies the input of the MUX 1 and MUX 2 which is selected in a particular step by the control circuit 8. OE ACTIVE and OE DISABLED indicates that the outputs of the buffers identified are enabled or disabled, respectively. PROC STORE means that the processor identified is used for storing a field of video image from video camera 21. PROC DISP means that the processor identified is used for displaying the contents of VMEM 1 or VMEM 2 on the monitor 53. VMEM ENA and VMEM DISAB indicates whether the video memory identified is enabled or disabled by circuit 8. In step 2 of FIG. 7, OE 3,4 ENA/DISAD by VMEM 2, bit 15 indicates that the output of the buffers identified is either enabled or disabled depending on the status of bit 15 in each of the words read from VMEM 2.

Referring to FIG. 5, in the live mode, in a repetitive two-step process which is synchronized with successive vertical sync signals, successive fields of video images from the video camera 21 are alternately stored in and subsequently displayed on the video monitor 53 from the video memories VMEM 1 and VMEM 2 under the control of the two processors PROC 1 and PROC 2 and the control circuit 8. That is, in step 1, the A input of MUX 1 and MUX 2 is selected and a field of video image from the video camera 21 is stored in VMEM 1 via A/D 35 and BUFF 1 under the control of PROC 1 and circuit 8 while the contents of VMEM 2 are being displayed via BUFF 4 and D/A 50 on the monitor 53 under the control of PROC 2 and circuit 8. In step 2, the B input of MUX 1 and MUX 2 is selected and a field of video image from the video camera 21 is stored in VMEM 2 via A/D 35 and BUFF 2 under the control of PROC 1 and circuit 8 while the contents of VMEM 1 are being displayed via BUFF 3 and D/A 50 under the control of PROC 2. Steps 1 and 2 are repeated until the mode is terminated by a signal from the CPU.

Referring to FIG. 6, in the capture and then display mode there are four steps. The first two steps are identical to the two steps in the live mode described above. That is, in step 1 input A of MUX 1 and MUX 2 is selected and a field of video image from the video camera 21 is stored in VMEM 1 under the control of PROC 1 and circuit 8 while the contents of VMEM 2 are being displayed on the monitor 53 under the control of PROC 2 and circuit 8. In step 2, input B of MUX 1 and MUX 2 is selected and a field of video image from the video camera 21 is stored in VMEM 2 under the control of PROC 1 and circuit 8 while the contents of VMEM 1 are being displayed under the control of PROC 2 and circuit 8. Thereafter, in a repetition of the third and fourth steps, the contents of VMEM 1 and VMEM 2 are alternately displayed on the monitor 53 via BUFF 3 and BUFF 4 under the control of PROC 2 and circuit 8 until the mode is terminated by a signal from the CPU.

In both the live mode and the capture and then display mode the output enable signals OE3 and OE4 are passed simultaneously through MUX 96 via its C inputs to lines 109 and 110, respectively.

Referring to FIG. 7, in the mix mode there are two steps in which the contents of VMEM 1 and VMEM 2 are selectively read and displayed. In the first step, input A of MUX 1 and MUX 2 is selected and a field of video image from the video camera 21 is stored in VMEM 1 under the control of PROC 1 and circuit 8 while the contents of VMEM 2 are being displayed under the control of PROC 2 and circuit 8. In this mode, the contents of VMEM 2 typically comprise data received from the CPU 3. In step 2, with the control signal on line 9 of the MUX 96 (FIG. 4) coupling the lines 109 and 110 to the D inputs of MUX 96, the contents of each word in both VMEM 1 and VMEM 2 are read in synchronism under the control of PROC 1 and PROC 2 into BUFF 3 and BUFF 4, respectively. As the words from VMEM 1 and VMEM 2 are read, the contents of the word from either VMEM 1 or VMEM 2 are displayed on the monitor 53 under the control of PROC 1 or PROC 2, depending on the status of bit 15 of each word read from VMEM 2. For example, if bit 15 of the word read from VMEM 2 is a "1", the output of BUFF 3 is enabled and a video image of the word read from VMEM 1 is displayed on the monitor 53. In this case, while PROC 1 is used for reading the words from VMEM 1, the VSYNC and HSYNC pulses from PROC 2 are used for displaying the words read from VMEM 1. Alternatively, if bit 15 of the word read from VMEM 2 is a "0", the output of BUFF 4 is enabled and a video image of the word read from VMEM 2 into BUFF 4 is displayed on the monitor 53 under the control of PROC 2. After a field of data from VMEM 1 and VMEM 2 is displayed, steps 1 and 2 are repeated until the mode is terminated by a signal from the CPU.

While a preferred embodiment of the present invention is described above, it is contemplated that numerous modifications may be made thereto for particular applications without departing from the spirit and scope of the present invention. Accordingly, it is intended that the embodiment described be considered only as an illustration of the present invention and that the scope thereof should not be limited thereto but be determined by reference to the claims hereinafter provided.

What is claimed is:

1. A video interface circuit for displaying a video camera image on a video monitor comprising:
   a first and a second video memory;
   a first and a second processor adapted to receive signals from a central processing unit;
   means for storing data corresponding to video signals from a video camera in said first video memory under the control of said first processor during a first time period;
   means for transferring data from said second video memory for displaying a video image thereof on a video monitor under the control of said second processor during said first time period;
   means for storing data corresponding to video signals from said video camera in said second video memory under the control of said first processor during a second time period; and
   means for transferring data from said first video memory for displaying a video image thereof on said video monitor under the control of said second processor during said second time period.

2. A circuit according to claim 1 wherein said first processor comprises:
   a vertical counter for generating vertical sync pulses;
   a horizontal counter for generating horizontal sync pulses;
   means for coupling said horizontal counter to a source of pixel clock pulses for advancing said horizontal counter;
   means for coupling said horizontal counter to said vertical counter for advancing said vertical counter;
   means for coupling said vertical counter to a source of vertical sync pulses from said video camera for resetting said vertical counter;
   means for coupling said horizontal counter to a source of vertical and horizontal sync pulses from said video camera for resetting said horizontal counter; and
   an address and memory control signal generator coupled to said vertical and horizontal counters which is responsive to said vertical and horizontal sync pulses from said counters for addressing said first and said second video memories; and said second processor comprises:
   a vertical counter for generating vertical sync pulses;
   a horizontal counter for generating horizontal sync pulses;
   means for coupling said horizontal counter to a source of pixel clock pulses for advancing said horizontal counter;
   means for coupling said horizontal counter to said vertical counter for advancing said vertical counter;
   means for coupling said vertical counter to a source of vertical sync pulses from said video camera for resetting said vertical counter;
   means for coupling said horizontal counter to a source of vertical sync pulses from said video camera for resetting said horizontal counter;
   an address and memory control signal generator coupled to said vertical and horizontal counters which is responsive to said vertical and horizontal sync pulses from said counters for addressing said first and said second video memories; and
   means for coupling said vertical and horizontal sync pulses from said vertical and horizontal counters in said second processor to said video monitor for controlling the display of data from said first and said second video memories on said video monitor.

3. A circuit according to claim 1 wherein said circuit is responsive to vertical sync pulses and said first and said second time periods comprise the periods between successive first and second vertical sync pulses, respectively.

4. A video interface circuit comprising:
   a first and a second video memory;
   a first and a second processor adapted to receive signals from a central processing unit;
   first means for storing data corresponding to video signals from a video camera in said first video memory under the control of said first processor during a first time period;
   second means for transferring data from said second video memory for displaying a video image thereof on a video monitor under the control of said second processor or during said first time period;
   means for storing data corresponding to video signals from said video camera in said second video memory under the control of said first processor while simultaneously transferring data from said first video memory for displaying a video image thereof on said video monitor under the control of said second processor during a second time period;
   means for transferring data from said first video memory for displaying a video image thereof on said video monitor under the control of said second processor during a third time period; and
   means for transferring data from said second video memory for displaying a video image thereof on said video monitor under the control of said second processor during a fourth time period.

5. A circuit according to claim 4 wherein said first processor comprises:
   a vertical counter for generating vertical sync pulses;

a horizontal counter for generating horizontal sync pulses;
means for coupling said horizontal counter to a source of pixel clock pulses for advancing said horizontal counter;
means for coupling said horizontal counter to said vertical counter for advancing said vertical counter;
means for coupling said vertical counter to a source of vertical sync pulses from said video camera for resetting said vertical counter;
means for coupling said horizontal counter to a source of vertical and horizontal sync pulses from said video camera for resetting said horizontal counter; and
an address and memory control signal generator coupled to said vertical and horizontal counters which is responsive to said vertical and horizontal sync pulses from said counters for addressing said first and said second video memories; and said second processor comprises:
a vertical counter for generating vertical sync pulses;
a horizontal counter for generating horizontal sync pulses;
means for coupling said horizontal counter to a source of pixel clock pulses for advancing said horizontal counter;
means for coupling said horizontal counter to said vertical counter for advancing said vertical counter;
means for coupling said vertical counter to a source of vertical sync pulses from said video camera for resetting said vertical counter;
means for coupling said horizontal counter to a source of vertical sync pulses from said video camera for resetting said horizontal counter;
an address and memory control signal generator coupled to said vertical and horizontal counters which is responsive to said vertical and horizontal sync pulses from said counters for addressing said first and said second video memories; and
means for coupling said vertical and horizontal sync pulses from said vertical and horizontal counters in said second processor to said video monitor for controlling the display of data from said first and said second video memories on said video monitor.

6. A circuit according to claim 4 wherein said circuit is responsive to vertical sync pulses and said first and said second, said third and said fourth time periods comprise the periods between successive first, second, third and fourth vertical sync pulses, respectively.

7. A video interface circuit comprising:
a first and a second processor;
a first and a second multiplexer;
a first and a second video memory;
a first, a second, a third and a fourth buffer;
means for coupling said first and said second processor to said first and said second multiplexer;
means for coupling said first and said second multiplexer to said first and said second video memories, respectively;
means for coupling said first video memory to said first and said third buffers;
means for coupling said second video memory to said second and said fourth buffers;
means for coupling said first and said second buffers to a video camera;
means for coupling said third and said fourth buffers to a video monitor; and
means for providing control signals to said first and said second multiplexer, said first and said second video memory and said first, said second, said third and said fourth buffers for storing video signals from said video camera in said first video memory under the control of said first processor while simultaneously displaying video signals from said second video memory on said monitor under the control of said second processor during a first time period and for storing video signals from said video camera in said second video memory under the control of said first processor while displaying video signals from said first video memory on said monitor under the control of said second processor during a second time period.

8. A circuit according to claim 7 wherein said circuit is responsive to vertical sync pulses and said first and said second time periods comprise the periods between successive first and second vertical sync pulses, respectively.

9. A video interface circuit comprising:
a first and a second processor;
a first and a second multiplexer;
a first and a second video memory;
a first, a second, a third and a fourth buffer;
means for coupling said first and said second processor to said first and said second multiplexer;
means for coupling said first and said second multiplexer to said first and said second video memories, respectively;
means for coupling said first video memory to said first and said third buffers;
means for coupling said second video memory to said second and said fourth buffers;
means for coupling said first and said second buffers to a video camera;
means for coupling said third and said fourth buffers to a video monitor; and
means for generating control signals to said first and said second multiplexer, said first and said second video memory and said first, said second, said third and said fourth buffers for storing video signals from said video camera in said first video memory under the control of said first processor while simultaneously displaying video signals from said second video memory on said monitor under the control of said second processor in a first time period, for storing video signals from said video camera in said second video memory under the control of said first processor while displaying video signals from said first video memory on said monitor under the control of said second processor in a second time period, for displaying video signals from said first video memory on said monitor under the control of said second processor in a third time period, and for displaying video signals from said second video memory on said monitor under the control of said second processor in a fourth time period.

10. A circuit according to claim 9 wherein said circuit is responsive to vertical sync pulses and said first and said second, said third and said fourth time periods comprise the periods between successive first, second, third and fourth vertical sync pulses, respectively.

11. A video interface circuit for displaying video camera image on a video monitor comprising:

a first and a second video memory;
a first and a second processor;
means for storing data corresponding to video signals from a video camera in said first video memory under the control of said first processor during a first time period;
means for transferring data from said second video memory for displaying a video image thereof on a video monitor under the control of said second processor during said first time period;
means for storing data corresponding to video signals from said video camera in said second video memory under the control of said first processor during a second time period; and
means for transferring data from said first video memory for displaying a video image thereof on said video monitor under the control of said second processor during said second time period wherein said first processor comprises:
a vertical counter for generating vertical sync pulses;
a horizontal counter for generating horizontal sync pulses;
means for coupling said horizontal counter to a source of pixel clock pulses for advancing said horizontal counter;
means for coupling said horizontal counter to said vertical counter for advancing said vertical counter;
means for coupling said vertical counter to a source of vertical sync pulses from said video camera for resetting said vertical counter;
means for coupling said horizontal counter to a source of vertical and horizontal sync pulses from said video camera for resetting said horizontal counter; and
an address and memory control signal generator coupled to said vertical and horizontal counters which is responsive to said vertical and horizontal sync pulses from said counters for addressing said first and said second video memories; and said second processor comprises:
a vertical counter for generating vertical sync pulses;
a horizontal counter for generating horizontal sync pulses;
means for coupling said horizontal counter to a source of pixel clock pulses for advancing said horizontal counter;
means for coupling said horizontal counter to said vertical counter for advancing said vertical counter;
means for coupling said vertical counter to a source of vertical sync pulses from said video camera for resetting said vertical counter;
means for coupling said horizontal counter to a source of vertical sync pulses from said video camera for resetting said horizontal counter;
an address and memory control signal generator coupled to said vertical and horizontal counters which is responsive to said vertical and horizontal sync pulses from said counters for addressing said first and said second video memories; and
means for coupling said vertical and horizontal sync pulses from said vertical and horizontal counters in said second processor to said video monitor for controlling the display of data from said first and said second video memories on said video monitor.

12. A video interface circuit comprising:
a first and a second video memory;
a first and a second processor;
first means for storing data corresponding to video signals from a video camera in said first video memory under the control of said first processor during a first time period;
second means for transferring data from said second video memory for displaying a video image thereof on a video monitor under the control of said second processor during said first time period;
means for storing data corresponding to video signals from said video camera in said second video memory under the control of said first processor while simultaneously transferring data from said first video memory for displaying a video image thereof on said video monitor under the control of said second processor during a second time period;
means for transferring data from said first video memory for displaying a video image thereof on said video monitor under the control of said second processor during a third time period; and
means for transferring data from said second video memory for displaying a video image thereof on said video monitor under the control of said second processor during a fourth time period wherein said first processor comprises:
a vertical counter for generating vertical sync pulses;
a horizontal counter for generating horizontal sync pulses;
means for coupling said horizontal counter to a source of pixel clock pulses for advancing said horizontal counter;
means for coupling said horizontal counter to said vertical counter for advancing said vertical counter;
means for coupling said vertical counter to a source of vertical sync pulses from said video camera for resetting said vertical counter;
means for coupling said horizontal counter to a source of vertical and horizontal sync pulses from said video camera for resetting said horizontal counter; and
an address and memory control signal generator coupled to said vertical and horizontal counters which is responsive to said vertical and horizontal sync pulses from said counters for addressing said first and said second video memories; and said second processor comprises:
a vertical counter for generating vertical sync pulses;
a horizontal counter for generating horizontal sync pulses;
means for coupling said horizontal counter to a source of pixel clock pulses for advancing said horizontal counter;
means for coupling said horizontal counter to said vertical counter for advancing said vertical counter;
means for coupling said vertical counter to a source of vertical sync pulses from said video camera for resetting said vertical counter;
means for coupling said horizontal counter to a source of vertical sync pulses from said video camera for resetting said horizontal counter;
an address and memory control signal generator coupled to said vertical and horizontal counters which is responsive to said vertical and horizontal sync pulses from said counters for addressing said first and said second video memories; and
means for coupling said vertical and horizontal sync pulses from said vertical and horizontal counters in said second processor to said video monitor for controlling the display of data from said first and said second video memories on said video monitor.

* * * * *